United States Patent
Nguyen et al.

[11] Patent Number: 6,025,705
[45] Date of Patent: *Feb. 15, 2000

[54] DC-TO-DC CONVERTER

[75] Inventors: Donald J. Nguyen, Portland, Oreg.; Geron Mark Johnston, University Pl.; Robert D. Wickersham, Lacey, both of Wash.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/998,122

[22] Filed: Dec. 24, 1997

[51] Int. Cl.[7] .............................. G05F 1/40; G05B 24/02; H02H 7/122
[52] U.S. Cl. ............................. 323/282; 323/351; 363/56
[58] Field of Search .................................. 363/50, 55, 56; 323/282, 351, 271, 265, 284; 327/109

[56] References Cited

U.S. PATENT DOCUMENTS

| | | | |
|---|---|---|---|
| 4,578,630 | 3/1986 | Grosch | 323/271 |
| 4,745,537 | 5/1988 | Cheung | 363/37 |
| 5,282,124 | 1/1994 | Nakamura et al. | 363/56 |
| 5,289,360 | 2/1994 | Canova | 363/56 |
| 5,602,724 | 2/1997 | Balakrishnan | 363/56 |
| 5,705,919 | 1/1998 | Wilcox | 323/282 |
| 5,744,943 | 4/1998 | Tokai | 323/282 |
| 5,811,962 | 9/1998 | Ceccherelli et al. | 323/282 |
| 5,847,554 | 12/1998 | Wilcox et al. | 323/282 |

OTHER PUBLICATIONS

Unitrode Product and Application Handbook, 1995–6, pp. 10–135 and 10–136 No Date.

*Primary Examiner*—Peter S. Wong
*Assistant Examiner*—Bao Q. Vu
*Attorney, Agent, or Firm*—Howard A. Skaist

[57] ABSTRACT

Briefly, in accordance with one embodiment of the invention, a circuit includes a DC-to-DC converter. The DC-to-DC converter includes a high-side field effect transistor (FET) and FET driver. The gate of the high-side FET is AC coupled to the FET driver. The gate-to-source electrical path of the high-side FET is coupled to be driven by a substantially fixed voltage during circuit operation.

21 Claims, 2 Drawing Sheets

DC-TO-DC CONVERTER

BACKGROUND

1. Field

The present invention related to voltage converters, and more particularly, to DC-to-DC voltage converters.

2. Background Information

Direct-current (DC) to direct-current (DC) converters are well-known in the art. Such circuitry or devices are typically employed to convert from one DC voltage signal level to another DC voltage signal level. This may be useful in a variety of environments.

These types of converters are particularly useful in mobile applications, such as in connection with notebook computers, for example. In such applications, the voltage signal level of a battery or similar voltage source tends to decrease over time as the battery is exhausted and the battery charge reserve is reduced. Therefore, a DC-to-DC converter may useful to provide a substantially constant voltage signal level in this environment.

One disadvantage in this environment, however, is that typically this may consume undesirably large amounts of power. For example, where a power supply providing 30 volts is fully charged and applied to the source of the high-side transistor of a DC-to-DC converter, a voltage swing of 30 volts may be applied to the transistor to change its state. Typically, the application of a large swing in voltage may result in a significant amount of power consumption, particularly in situations in which small resistances may be employed in order to sharpen the transition(s) of the voltage signal being applied. A need, therefore, exists for a DC-to-DC converter that may accommodate a wide range of voltage signal input levels in a relatively more efficient manner.

SUMMARY

Briefly, in accordance with one embodiment of the invention, a circuit includes a DC-to-DC converter. The DC-to-DC converter includes a high-side field effect transistor (FET) and FET driver. The gate of the high-side FET is AC coupled to the FET driver. The gate-to-source electrical path of the high-side FET is coupled to be driven by a substantially fixed voltage during circuit operation.

BRIEF DESCRIPTION OF THE DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description, when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Figure 1:
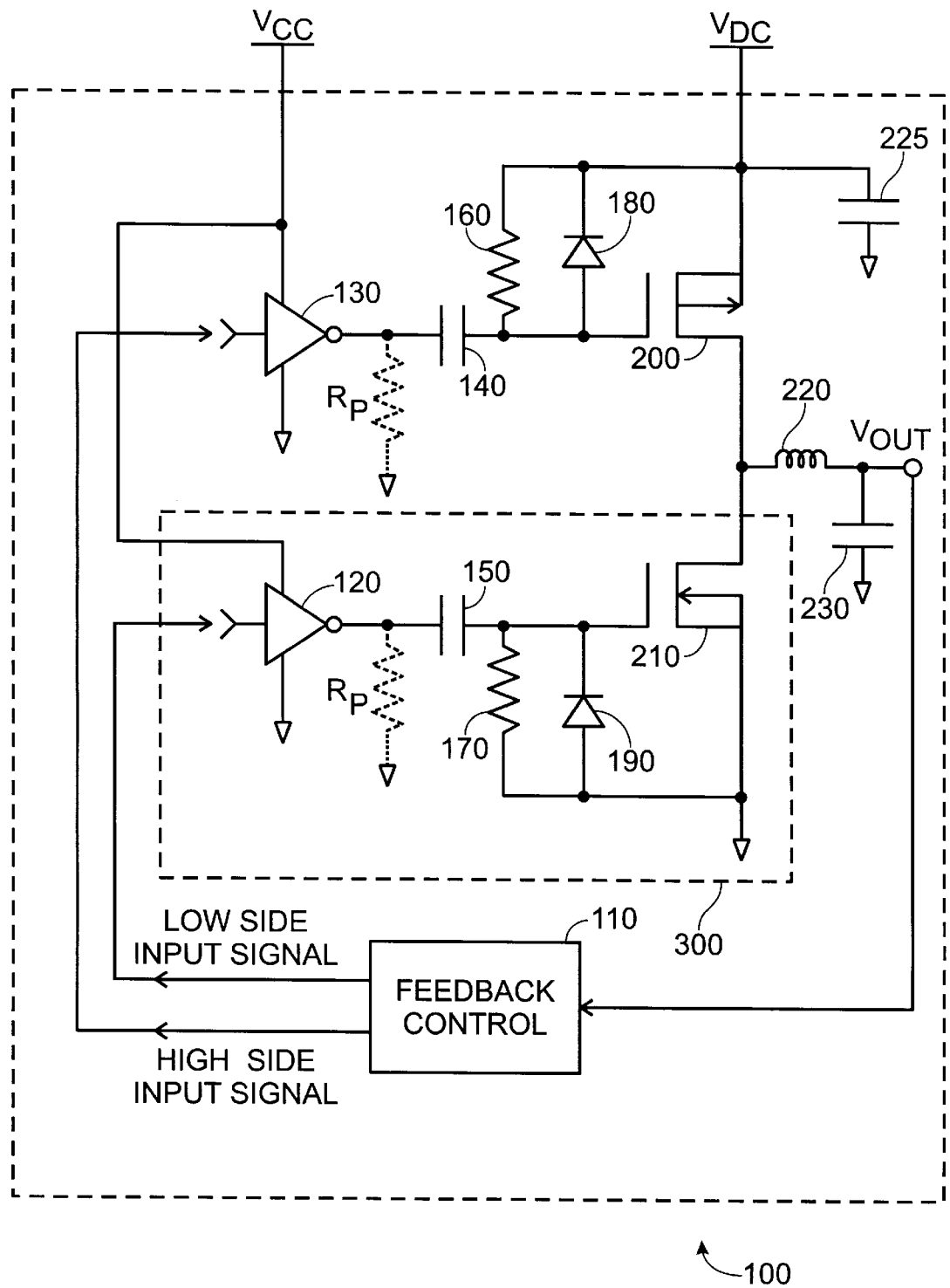
FIG. 1 is a circuit diagram illustrating an embodiment of a DC-to-DC converter in accordance with the present invention.

FIG. 1 is a circuit diagram illustrating an embodiment 100 of a DC-to-DC converter circuit in accordance with the present invention. Of course, the invention is not limited in scope to this particular embodiment. For example, alternatively a synchronous DC-to-DC converter or a non-synchronous DC-to-DC converter may be employed. In the embodiment illustrated in FIG. 1, two field effect transistors (FETs) are employed, although, again, the invention is not limited in scope in this respect. As is typically the case for a conventional DC-to-DC converter, a high-side FET, such as 200 in FIG. 1, and a low-side FET, such as 210 in FIG. 1, is provided. In this embodiment, FET 200 comprises a p-channel FET whereas FET 210 comprises an n-channel FET. Likewise, as illustrated, these FETs provide a signal path to an inductor 220. Although not illustrated in great detail, the filtered voltage output signal provided by inductor 220 and bulk capacitance 230 is provided to feedback control circuitry, such as 110 in FIG. 1, and this feedback control circuitry provides a low-side FET driver signal and a high-side FET driver signal. Therefore, based, at least in part, on the output voltage signal level, the feedback control circuitry operates to either increase or decrease the output voltage signal level produced by driving the input port of either the high-side FET or the low-side FET with an FET driver. In this particular embodiment, the FET drivers comprise integrated drivers 130 and 120, although the invention is not limited in scope in this respect. For example, a discrete driver circuit employing a FET and a bipolar transistor or another alternative driver may be employed. In conventional DC-to-DC converters, these FET drivers are directly coupled to the gates of the high-side and low-side FETs. Here, however, in the embodiment illustrated in FIG. 1, these drivers are AC coupled to the gates of the FETs by a capacitor, such as capacitors 140 and 150. Additionally, in this embodiment, for both the high-side and the low-side FET, a resistor and diode are coupled in parallel between the source and gate of each respective FET. The advantage of employing this approach will be described in more detail hereinafter.

As previously indicated, in mobile applications, such as with a notebook computer, for example, the voltage signal level of the power source varies significantly, typically in relationship with the charge remaining. For the embodiment illustrated in FIG. 1, $V_{DC}$ may comprise a battery or other voltage power source employed in such an application. One of the difficulties of employing a DC-to-DC converter that is efficient, however, is also ensuring that it will work in an environment in which the voltage source level varies widely or in which the FET driver voltage source is typically at a voltage level well beyond the voltage swing rating, such as in the case of power sources for telephone equipment (typically 48 volts).

When the FET driver is coupled directly to the FET, namely the high-side p-channel FET, such as 200 illustrated in FIG. 1, the power source $V_{DC}$ would be employed as the power source to drive the gate of FET 200. This arrangement restricts $V_{DC}$ to an operating range from approximately 5 to 18 volts. However, the embodiment illustrated in FIG. 1 allows FET driver 130 to use another power source, $V_{CC}$, for its voltage supply. Therefore, the FET gate may be driven with a lower voltage power source, such as in the range of five (5) to seven (7) volts, which provides better efficiency than overdriving the FET with a much higher voltage power source.

Likewise, the voltage for the electrical path including the DC-to-DC converter is limited to the rating of the power FET's gate-to-source voltage. This is typically about 20 volts for state-of-the-art power FETs. In contrast, because the gate-to-source voltage of the high-side and low-side FETs are AC coupled for the embodiment illustrated, the electrical path voltage is instead limited to the power FET's drain-to-source rating and the capacitor voltage rating rather than its gate-to-source rating. This provides additional flexibility because a range of choices are available for FETs with different drain-to-source voltage ratings. Likewise, a range of choices exists for capacitor voltage ratings.

Another advantage of this embodiment in accordance with the invention, when it is AC coupled at the high-side FET and the low-side FET, includes protecting the high-side FET from damage when the DC-to-DC converter is abnormally short-circuited at its output port or protecting the low-side FET when an over-voltage or backdriven condition occurs. Specifically, in this embodiment, when a short-circuit occurs and is sustained, feedback control circuit 110 produces a signal so that high-side FET driver 130 drives the gate of FET 200. If FET driver 130 and FET 200 were directly coupled, this would typically result in damage to FET 200. However, due to the existence of capacitor 140 in the embodiment illustrated in FIG. 1, resistor 160 discharges the gate-to-source parasitic capacitance of FET 200 which ultimately turns off FET 200 and, therefore, prevents damage from occurring. More specifically, for this embodiment, a self-latching operation occurs where a short-circuit is sustained.

In addition, due to the presence of diode 180, the FET gate is provided an additional 0.7 volts of "turn-off" margin in this embodiment, assuming a 0.7 volts diode voltage drop, for example. Power source $V_{DC}$ may eventually droop and yet still result in satisfactory operation in comparison with an approach in which the output port of a FET driver directly couples to the gate of a FET. In addition, where the driver is directly coupled, the power source designated in FIG. 1 as $V_{DC}$ may drop to a voltage signal level of approximately 4.5 volts with the converter still providing satisfactory performance; however, due to the presence of Vcc, fixed at 5 or 7 volts in a possible embodiment, for example, the $V_{DC}$ power source may now approach a voltage signal level as low as a nominal output regulating voltage which is typically 2.9 volts in this application, although the invention is not limited in scope in this respect. For example, if Vcc is 5 volts, the AC coupling may drive the gate to as low as (2.9 volts–5.0 volts minus the diode drop of 180) or –2.8 volts. In the embodiment, Vcc is obtained from a boost converter having power provided by $V_{DC}$, although the invention is not limited in scope in this respect.

The operation of the embodiment illustrated in FIG. 1 is as follows. Assume that the signal level of voltage signal $V_{OUT}$ is too low and this is detected by feedback control circuit 110. Then, after feedback circuit 110 detects this low voltage output signal level, the feedback circuit provides a signal, designated in FIG. 1 as the low side input signal, to turn off FET 210, then provides another signal, designated as the high-side input signal, to FET driver 130. As a result, FET driver 130 produces an output signal to drive FET 200. In the embodiment shown, capacitor 140 substantially decouples the output signal of FET driver 130, allowing the AC or alternating current component, a square wave in this particular embodiment, to pass substantially through to the gate of FET 200. Therefore, the DC or direct current component of the output signal of FET driver 130 "rejected" by capacitor 140. Thus, regardless of the input voltage signal level provided by power source $V_{DC}$, the peak-to-peak voltage signal driving the gate of FET 200 is the voltage of Vcc. Likewise, due to the presence of diode 180 across the gate and source of FET 200, the gate of FET 200 is clamped one diode drop from the source voltage level. Therefore, the peak voltage signal level applied to the gate of FET 200 is the voltage of the $V_{CC}$ power source, which in this particular embodiment is five (5) volts, minus one $V_{diode}$, where $V_{diode}$ is the voltage drop across diode 180. Aside from the other advantages previously mentioned, the gate-to-source voltage in this particular embodiment provides better threshold margin than would typically occur for an FET driver directly coupled to the gate of FET 200 because the gate voltage will now swing to 0.7 volts below the source voltage.

A termination resistor, $R_P$ indicated in FIG. 1 by dotted lines, may be coupled to ground ahead of capacitors 140 and 150 to improve signal slew rate performance. It was found experimentally that the P-channel slew rate may be affected by the omission of $R_P$ and insufficient capacitance for 220. Resistor 160 is employed to keep FET 200 "turned off" before the application of power to the DC-to-DC converter circuit by removing charge from the gate. The resistance value of the resistor should not be so small that power is unnecessarily consumed due to a large current flow through the resistor during circuit operation. Conversely, the resistance value should also not be too high. The resistance value of resistor 160 in conjunction with the capacitance value of capacitor 140 forms an RC time constant, so that if the output port of the converter is short-circuited by external means, as previously described, arid capacitor 140 charges, it does not take too long for FET 200 to turn off. The value chosen for RC may take into account the circuit efficiency and the absolute maximum ratings of the FET. Also, the resistance is employed to prevent the AC signal from drifting up causing a condition where the FET is on or partially on, but not fully on and possibly causing overheating and damage to the FET.

Another advantage of this particular embodiment is that it allows power source $V_{CC}$ to be a common power source for drivers 120 and 130, as illustrated in FIG. 1. This allows for better circuit integration, as is frequently desirable. This embodiment, for example, may be implemented using one driver package. If an embodiment in accordance with the invention were not employed, such as if the FET drivers were coupled directly to the gate of the FETs, then a power source having a voltage higher than five (5) volts would be employed for driver 130, whereas driver 120 might employ a power source of lower voltage, and, two different power supplies would be employed. Thus, two driver packages would be employed.

Figure 2:
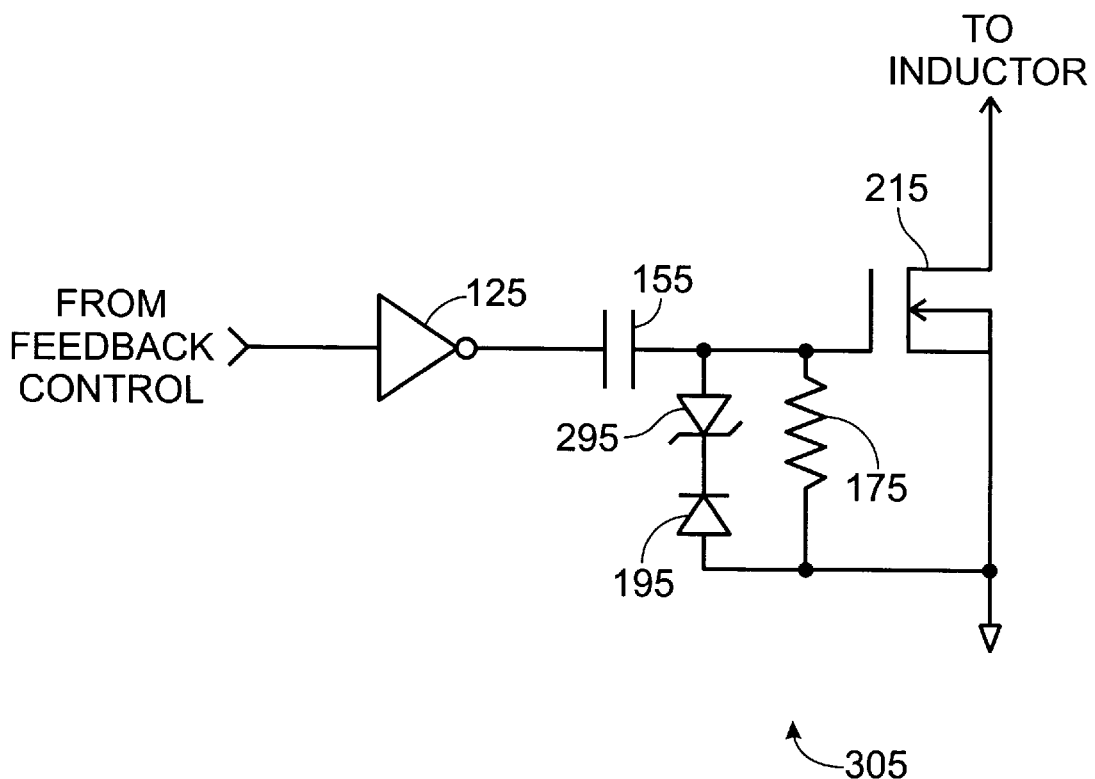
FIG. 2 is a circuit diagram illustrating an alternative embodiment of a portion of the embodiment illustrated in FIG. 1.

FIG. 2 illustrates an alternative embodiment 305 for the portion of the embodiment of FIG. 1 designated as 300. In FIG. 2, this alternative embodiment includes a zener diode 295. In a DC-to-DC converter circuit, a large miller capacitance that may be present between the drain and the gate of the low-side FET, such as FET 210. This parasitic element, inherent to the FET itself, may pass a current to its gate due to the fast-rising edge of the high-side FET turning on. A sufficient voltage may appear at the gate so that the low-side FET is "turned on" or conducting at a time when it is desired that it not be turned on. As illustrated in FIG. 1, a diode 190 may provide an additional margin of the voltage drop across the diode from the turn-on threshold of the FET. However, this may not be sufficient to prevent FET 210 from being turned on. Therefore, zener diode 295 is employed to ensure the voltage signal level at the gate of FET 215 in FIG. 2 is sufficiently negative so that even with the presence of some miller capacitance, FET 215 will not "turn on" while FET 200 is also "turning on". The presence of zener diode 295 ensures that this will not occur because the voltage drop across zener diode 295 results in a greater negative voltage signal level at the gate of FET 215 and, in addition, the greater negative voltage signal level applied at the gate also reduces the miller capacitance present. It is noted, however, that this particular embodiment may be omitted in situations in which the low-side FET has a sufficiently small miller capacitance that the FET is not "turned on" as previously described. For example, where a Silicone Si4410DY FET is employed (available from TEMIC c/o Silicone, Inc., Santa Clara, Calif.), satisfactory operation may in some embodiments be obtained without employing the illustrated in FIG. 2.

An embodiment of the method of driving a high-side field effect transistor in a DC-to-DC converter in accordance with the present invention may be accomplished as follows. An embodiment of a DC-to-DC converter in accordance with the present invention, such as the embodiments previously described, may be employed to implement this particular embodiment of a method of driving a high-side field effect transistor. An alternating voltage,[] signal with substantially no DC component may be applied to the gate of a high-side field effect transistor in a DC-to-DC converter, such as the alternating voltage signal produced by driver 130 and applied to the gate of FET 200 via capacitor 140, as previously illustrated and described with respect to FIG. 1. Likewise, as previously described and illustrated, the gate of the high-side FET, such as FET 200, is at a voltage signal level that is a substantially fixed voltage drop away from the voltage at the source of the FET. For example, as illustrated in FIG. 1, the source of FET 200 is at voltage level $V_{DC}$. However, due to the presence of diode 180 coupled between the gate and source of FET 200, the gate of FET 200 is, in this case, a diode voltage drop from the voltage at the source of FET 200.

Likewise, an embodiment of driving a high side field effect transistor in accordance with the present invention will be typically implemented in a DC-to-DC converter that includes a lowside FET. As illustrated in FIG. 1, one such example of a low-side FET is FE T 210. For example, an alternating signal with substantially no DC component may be applied to the gate of low-side FET 210. As discussed with respect to FET 200, the gate of low-side FET 210 may be at a voltage signal level that is a substantially fixed voltage drop away from the voltage at the source of low-side FET 210. Again, as illustrated in FIG. 1, this substantially fixed voltage drop may comprise one diode voltage drop, such as the voltage drop across diode 190 in FIG. 1. Likewise, in an alternative embodiment, the substantially fixed voltage drop may comprise more than one diode voltage drop. For example, as illustrated in FIG. 2, diode 195 and zener diode 295 are coupled in series and, therefore, the substantially fixed voltage drop in this embodiment comprises more than one diode voltage drop.

As previously described, the DC-to-DC converter, such as the one illustrated in FIG. 1, modulates the alternating voltage signals applied to the gates of the high side and low side FETs, such as FET 200 and FET 210, to produce the desired output voltage signal, such a $V_{OUT}$ in FIG. 1. Typically, as illustrated in FIG. 1, these alternating voltage signals are modulated using feedback control, such as may be accomplished based, at least in part, on the output voltage signal produced using feedback control circuitry 110.

While certain features of the invention have been illustrated and described herein, many, many modifications, substitutions, changes in equivalence will now occur to those skilled in the art. It is, therefore, to be understood that the appended claims are intended to cover all such modifications and changes as fall within the true spirit of the invention.

We claim:

1. A circuit comprising: a DC-to-DC converter including a high-side FET and FET driver; the gate of said high-side FET being AC coupled to said FET driver; the gate-to-source electrical path of said high-side FET being coupled to be driven by a substantially fixed positive voltage during circuit operation.

2. The circuit of claim 1, wherein said DC-to-DC converter comprises a synchronous DC-to-DC converter including a low-side FET and FET driver;

the gate of said low-side FET being AC coupled to said low-side FET driver;

the gate-to-source electrical path of said low-side FET being coupled to be driven by a substantially fixed voltage during circuit operation.

3. The circuit of claim 2, wherein said FETs are AC coupled via a capacitor.

4. The circuit of claim 3, wherein said gate-to-source electrical paths each comprise a diode; said diode being coupled so that an AC signal applied to said gate via said capacitor is referenced at one diode voltage drop below the voltage at the source of said high-side FET.

5. The circuit of claim 4, wherein said diode is coupled in parallel with a resistive circuit element.

6. A circuit comprising: a DC-to-DC converter including a high-side FET and FET driver; the gate of said high-side FET being AC coupled to said FET driver; the gate-to-source electrical path of said hiqh-side FET being coupled to be driven by a substantially fixed voltage during circuit operation, wherein said gate-to-source electrical path comprises a diode coupled in parallel with a resistive circuit element, wherein a zener diode is coupled in series with said diode.

7. The circuit of claim 1, wherein said FET is AC coupled via a capacitor.

8. The circuit of claim 7, wherein said gate-to-source electrical path comprises a diode, said diode being coupled so that an AC signal applied to said gate via said capacitor is referenced at one diode voltage drop below the voltage at the source of said high-side FET.

9. The circuit of claim 8, wherein said diode is coupled in parallel with a resistive element.

10. A method of driving a high-side field effect transistor (FET) in a DC-to-DC converter comprising:

applying an alternating voltage signal with substantially no DC component to the gate of said FET, the gate of said FET being referenced to a voltage signal that is a substantially fixed positive voltage drop from the voltage at the source of said FET.

11. The method of claim 10, wherein the alternating voltage signal is applied to the gate by an FET driver via a capacitor.

12. The method of claim 11, wherein the substantially fixed voltage drop comprises one diode voltage drop.

13. The method of claim 10, wherein said DC-to-DC converter includes a low-side FET; and further comprising:

applying an alternating voltage signal with substantially no DC component to the gate of said low-side FET, the gate of said low-side FET being referenced to a voltage signal level that is a substantially fixed voltage drop from the voltage at the source of said low-side FET.

14. The method of claim 13, wherein the substantially fixed voltage drop from the voltage at the source of said low-side FET comprises one diode voltage drop.

15. The method of claim 13, where the substantially fixed voltage drop from the voltage at the source of said low-side FET comprises more than one diode voltage drop.

16. The method of claim 13, and further comprising:

modulating said alternating voltage signals to produce the desired output voltage signal of said DC-to-DC converter.

17. The method of claim 16, wherein said alternating voltage signals are modulated using feedback control based, at least in part, on the output voltage signal produced.

18. A circuit comprising: a DC-to-DC converter including a high-side FET and FET driver; the gate of said high-side FET being AC coupled to said FET driver; the gate-to-source electrical path of said high-side FET being coupled to be driven by a substantially fixed voltage during circuit operation, wherein said high-side FET and said FET driver are coupled so as to employ separate power sources in operation.

19. The circuit of claim 18, wherein said high-side FET and said FET driver are coupled so as to employ separate power sources that apply different respective voltages in operation.

20. The circuit of claim 19, wherein said high-side FET and said FET driver are coupled so that in operation said high-side FET employs a higher voltage power source than said FET driver.

21. The circuit of claim 1, wherein said high-side FET comprises a P-channel FET and said DC-to-DC converter includes an inductor coupled so that said inductor provides a filtered DC voltage output signal at its output port.

* * * * *

UNITED STATES PATENT AND TRADEMARK OFFICE
CERTIFICATE OF CORRECTION

PATENT NO.   : 6,025,705
DATED        : February 15, 2000
INVENTOR(S)  : Nguyen et al.

It is certified that error appears in the above-identified patent and that said Letters Patent is hereby corrected as shown below:

In column 4, at line 30, delete "arid" and insert --and--.

In column 5, at line 11, delete "Silicone" and insert --Siliconix--.

In column 5, at line 12, delete "Silicone" and insert --Siliconix--.

In column 5, at line 23, after "voltage" remove --,[]--.

In column 5, at line 42, delete "FE T" and insert --FET--.

Signed and Sealed this

Fifteenth Day of May, 2001

Attest:

NICHOLAS P. GODICI

Attesting Officer    *Acting Director of the United States Patent and Trademark Office*